United States Patent
Baderdinni et al.

(10) Patent No.: US 9,841,902 B2
(45) Date of Patent: Dec. 12, 2017

(54) PERIPHERAL COMPONENT INTERCONNECT EXPRESS CONTROLLERS CONFIGURED WITH NON-VOLATILE MEMORY EXPRESS INTERFACES

(71) Applicant: Avago Technologies General IP (Singapore) Pte. Ltd, Singapore (SG)

(72) Inventors: Anant Baderdinni, Norcross, GA (US); Horia Cristian Simionescu, Milpitas, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 263 days.

(21) Appl. No.: 14/548,828

(22) Filed: Nov. 20, 2014

(65) Prior Publication Data

US 2016/0147442 A1 May 26, 2016

(51) Int. Cl.
*G06F 3/06* (2006.01)
*G06F 13/42* (2006.01)

(52) U.S. Cl.
CPC ............ *G06F 3/061* (2013.01); *G06F 3/0644* (2013.01); *G06F 3/0674* (2013.01); *G06F 13/4221* (2013.01)

(58) Field of Classification Search
CPC ...... G06F 3/061; G06F 3/0644; G06F 3/0674; G06F 13/4221
See application file for complete search history.

(56) References Cited

U.S. PATENT DOCUMENTS

| | | | |
|---|---|---|---|
| 2014/0281040 A1* | 9/2014 | Liu | G06F 9/50 710/3 |
| 2014/0281106 A1* | 9/2014 | Saghi | G06F 3/0664 710/313 |
| 2014/0281151 A1 | 9/2014 | Yu et al. | |
| 2015/0370700 A1* | 12/2015 | Sabol | G06F 12/0246 711/103 |
| 2016/0004653 A1* | 1/2016 | Purkayastha | G06F 13/28 710/308 |

OTHER PUBLICATIONS

DRAM Assisted SErver Side Cache, Storage Switzerland, LLC, 2013.
IDT Announces World's First PCI Express Gen 3 Nvme NV-DRAM Controller, Integrated Device Technology, Sep. 6, 2012.
PMC Plugs DRAM Into PCI Express, PMC Sierra, Aug. 5, 2014.
Speeding Data Access With the Sun Flasher Accelerator F20 Pcie Card, Oracle, Jun. 2010.

* cited by examiner

*Primary Examiner* — Aracelis Ruiz
(74) *Attorney, Agent, or Firm* — Sheridan Ross P.C.

(57) ABSTRACT

Systems and methods presented herein provide for SSD data storage via PCIe controllers configured with NVMe interfaces. In one embodiment, a PCIe controller includes a plurality of buffers, a Dynamic Random Access Memory (DRAM) device, and an I/O processor operable to partition the DRAM device into a plurality of logical blocks. The controller also includes virtual function logic communicatively coupled to the logical blocks of the DRAM device and to the buffers. The virtual function logic is coupled to a host system through the I/O processor to process an I/O request from the host system to a logical block of the DRAM device, to retrieve data from the logical block to at least one of the buffers, and to transfer the data from the buffer to the host system.

25 Claims, 8 Drawing Sheets

PERIPHERAL COMPONENT INTERCONNECT EXPRESS CONTROLLERS CONFIGURED WITH NON-VOLATILE MEMORY EXPRESS INTERFACES

BACKGROUND

Peripheral Component Interconnect Express (PCIe) is a high-speed serial computer expansion bus standard and protocol that can be used as a data interface to flash memory devices, such as memory cards and solid state drives (SSDs). PCI Express storage controllers can be configured with Non-Volatile Memory Express (NVMe) logical interfaces to increase Input/Output (I/O) performance to these devices. For example, NVMe is a register level interface. NVMe defines a command set and a feature set for PCIe-based SSDs that allows host system software to access the SSDs through a relatively fast PCIe bus, streamlining the I/O stack to increase I/O speeds.

SUMMARY

Systems and methods presented herein provide for SSD data storage via PCIe controllers configured with NVMe interfaces. In one embodiment, a PCIe controller includes a plurality of buffers, a Dynamic Random Access Memory (DRAM) device, and an I/O processor operable to partition the DRAM device into a plurality of logical blocks. The controller also includes virtual function logic communicatively coupled to the logical blocks of the DRAM device and to the buffers. The virtual function logic is coupled to a host system through the I/O processor to process an I/O request from the host system to a logical block of the DRAM device, to retrieve data from the logical block to at least one of the buffers, and to transfer the data from the buffer to the host system.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
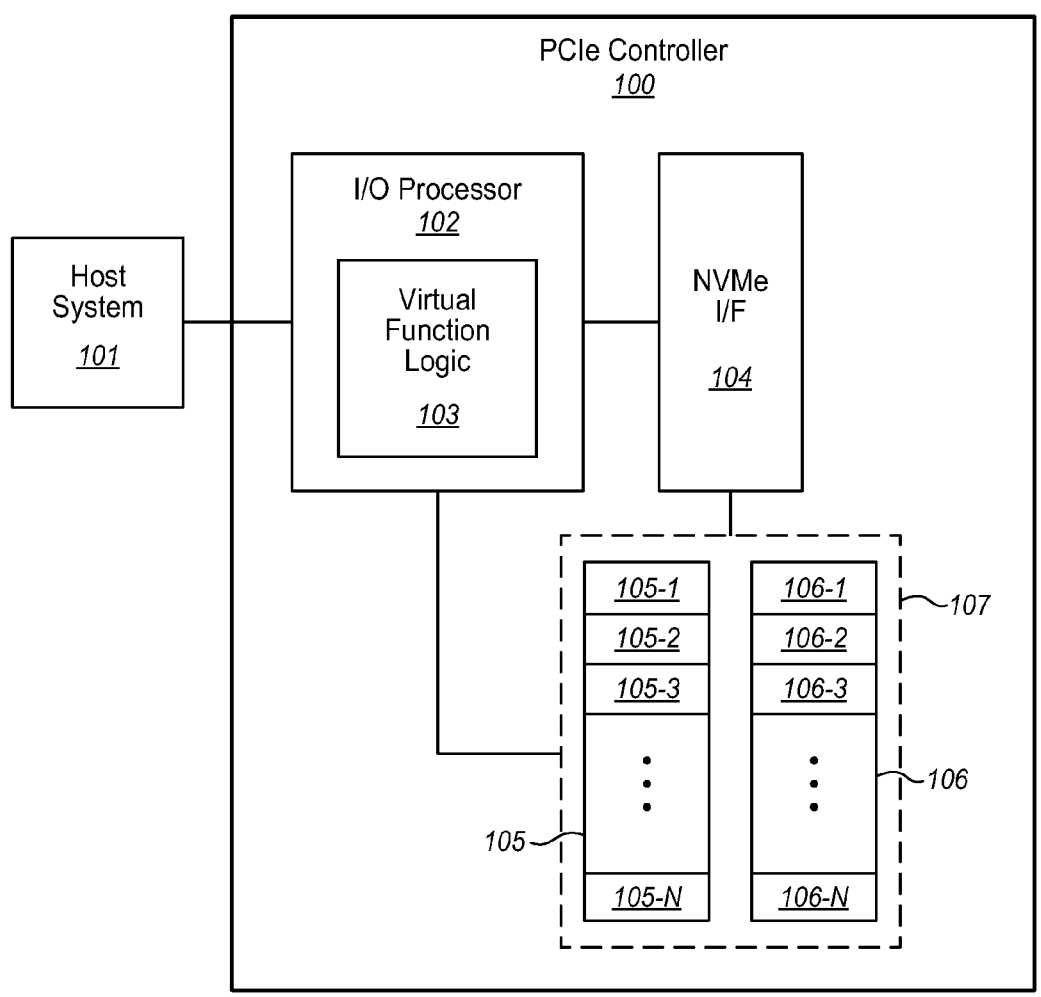
FIG. 1 is a block diagram of an exemplary PCIe controller configured with an NVMe interface.

FIG. 1 is a block diagram of an exemplary PCIe controller 100 configured with an NVMe interface 104. The PCIe controller 100 includes an I/O processor 102 that is operable to process I/O requests from a host system 101. Also configured with the PCIe controller 100 is a DRAM device 107. The I/O processor 102 is operable to partition the DRAM device 107 into a plurality of logical blocks 106-1-106-N (where "N" is simply intended to represent an integer greater than "1" and not necessarily equal to any other "N" reference designated herein) such that the host system 101 can direct I/Os thereto (e.g., via the NVMe interface 104). The I/O processor 102 may also configure a plurality of data buffers 105-1-105-N in the DRAM device 107 to assist in I/O processing and/or caching, but the data buffers 105 could be configured in other ways, such as separate physical buffers.

The DRAM device 107, and thus the logical blocks 106-1-106-N, are configured to be "non-volatile" such that the host system 101 can direct I/O requests thereto for persistent data storage. For example, the DRAM device 107 may be backed up by an alternative power supply, such as a super capacitor, to ensure that any data therein remains in the event of a power outage. Alternatively or additionally, the DRAM device 107 may be backed up by SSDs. An example of such is shown and described in greater detail below.

An NVMe interface 104 is also configured with the PCIe controller 104 to improve I/O processing. For example, as the DRAM device 107 appears as a long term or persistent storage device, the NVMe interface 104 can streamline the I/O stack and increase I/O speeds through a relatively fast PCIe bus to the DRAM device 107. Generally, this operation is performed by firmware that maps logical block addresses (LBAs) to memory addresses of the DRAM device 107. This allows the NVMe interface 104 to believe it is directing I/Os to SSDs.

The buffers 105 can be used to assist in this I/O processing. For example, the host system 101 may wish to store data of various read and write I/O requests in the logical blocks 106. The host system 101 may temporarily store some of this data in the buffers 105. While the number of buffers 105 and logical blocks 106 are illustrated as being the same, the number of buffers 105 can and typically does differ from the number of logical blocks 106.

The PCIe controller 100 also includes virtual function logic 103 that is operable to provide the host system 101 with a virtual I/O interface to the logical blocks 106. For example, a PCIe virtual function (VF) established by the virtual function logic 103 is a "lightweight" PCIe function on the PCIe controller 100 that supports single root I/O virtualization (SR-IOV). The VF is associated with the PCIe Physical Function (PF, not shown) on the PCIe controller 100 and represents a virtualized instance of the PCIe controller 100. Each VF generally has its own PCI configuration space and each VF is operable to share one or more physical resources on the PCIe controller 100, such as the NVMe interface 104, with the PF and other VFs. Additional details regarding the VFs and I/O processing to SSDs are shown and described below.

The PCIe controller 100 may also be operable to interface through the NVMe interface 104 with other forms of PCIe data storage including, SSDs, disk drives, memory devices (e.g., DRAM devices), and/or even other PCIe configured devices. However, the PCIe controller 100, via the non-volatilely configured DRAM 107, can operate as a persistent storage device in and of itself. One exemplary process 200 of the PCIe controller 100 is now shown and described in the flowchart of FIG. 2.

Figure 2:
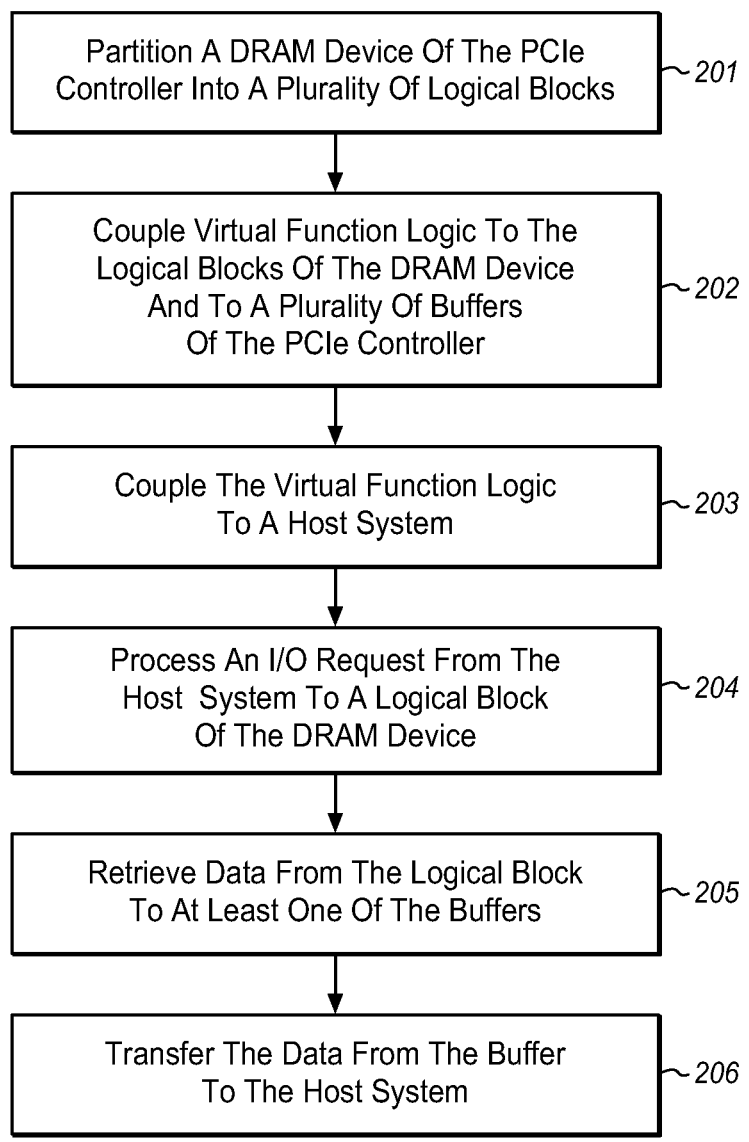
FIG. 2 is a flowchart of an exemplary process of the PCIe controller of FIG. 1.

In FIG. 2, the process 200 initiates with the I/O processor 102 partitioning the DRAM device 107 into a plurality of logical blocks 106, in the process element 201. Generally, the partitioning is performed by firmware resident within the PCIe controller 100. Thus, once the PCIe controller 100 "boots up", the firmware directs the I/O processor 102 to partition the DRAM 107 into the logical blocks 106 where they are maintained until the PCIe controller 100 is powered down. This includes mapping LBAs to memory addresses of the DRAM device 107.

In the process element 202, the I/O processor 102 couples the virtual function logic 103 to the logical blocks 106 of the DRAM device 107. The I/O processor 102 also couples the virtual function logic 103 to the buffers of the PCIe controller 100. In the process element 203, the I/O processor 102 couples virtual function logic 103 to the host system 101 such that the PCIe controller 100 can process I/O requests by the host system 101 to the logical blocks 106.

With the virtual function logic 103 coupled to the host system 101, the I/O processor 102 processes an I/O request from the host system 101 to a logical block of the DRAM 107, in the process element 204. From there, the I/O processor 102 retrieves the data from the logical block to at least one of the buffers 105, in the process element 205. For example, the host system 101 may require data that has been cached in one of the logical blocks 106. It's possible that the data being requested is larger than any one of the buffers 105. If the data is larger, the I/O processor 102 may retrieve that data from the logical block 106 to multiple buffers 105. Otherwise, the I/O processor 102 simply retrieves the data from the logical block 106 to one of the buffers 105. In any case, once the data is retrieved, the I/O processor 102 transfers the data from the buffers 105 to the host system 101, in the process element 206.

Figure 3:
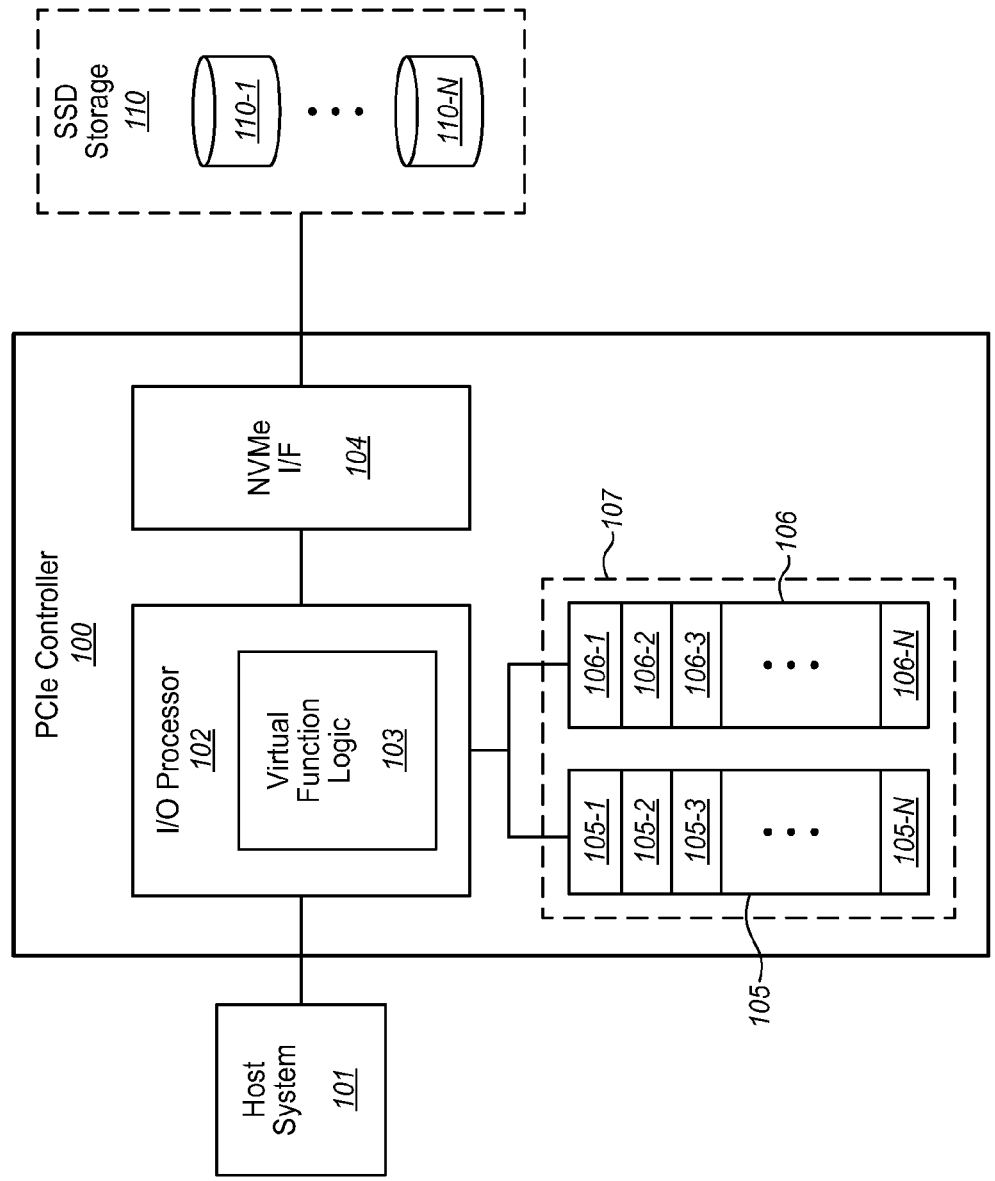
FIG. 3 is another block diagram of the exemplary PCIe controller coupled to a plurality of SSDs.

FIG. 3 is another block diagram of the exemplary PCIe controller 100 coupled to a plurality of SSDs 110-1-110-N. Generally, the SSDs 110 are configured with PCIe interfaces that are operable to communicate with PCIe devices such as the PCIe controller 100 using the PCIe protocol. The NVMe interface 104, similar to the embodiment of FIG. 1, improves I/O processing performance between the host system 101 and the SSDs 110.

Also configured with the PCIe controller 100 is the plurality of data buffers 105-1-105-N and the plurality of logical blocks 106-1-106-N. In this embodiment, the I/O processor 102 again partitions the DRAM device 107 into the logical blocks 106 that may be mapped to logical blocks of the SSDs 110 for I/O caching and processing. In this regard, the I/O processor 102 assigns LBAs to the logical blocks of the DRAM 107 that correspond to LBAs of the SSDs 110, again via mapping memory addresses of the DRAM device 107. The buffers 105 can be used to assist in this caching process as well as being used to cache other data by the host system 101. For example, the host system 101 may wish to store certain types of data such as log data of various read and write I/O requests to the SSDs 110. The host system 101 may store some of this data in the buffers 105.

The virtual function logic 103 is operable to provide the host system 101 with a virtual I/O interface to the SSDs 110. To illustrate, the virtual function logic 103, through the I/O processor 102, may present a virtual function to the host system 101 so that the host system 101 can process an I/O request to the logical block of the SSDs 110. The host system 101 directs the I/O request to the selected logical block of the SSD 110 through the virtual function, which in turn processes the I/O request through the logical block 106 of the DRAM 107.

For a write I/O request, the virtual function may extract the data of the I/O request and store it in the logical block 106 corresponding to the logical block of the SSD 110. That is, the logical blocks of the DRAM 107 may be mapped to and thus correspond to specific logical blocks of the SSDs 110. From there, the virtual function transfers data of the write I/O request from the logical block 106 of the DRAM 107 to the corresponding logical block of the SSD 110. By storing the data in a logical block 106 of the DRAM 107, other I/O processing can continue uninhibited.

For a read I/O request, the virtual function may process the I/O request to determine the logical block of the SSD 110 where the data is stored. Then, the virtual function may access the logical block 106 of the DRAM device 107 to determine whether the data of the I/O request is present there. If so, the virtual function may transfer the data of the I/O request to one or more of the buffers 105 such that the host system 101 can directly access the data at its convenience. Alternatively, the virtual function may transfer the data directly to the system 101 from the logical block 106. If the data is not located in the logical block 106, the virtual function may access the corresponding logical block of the SSD 110 to transfer it from that logical block to the logical block 106 of the DRAM 107 and ultimately to the host system 101.

Figure 4:
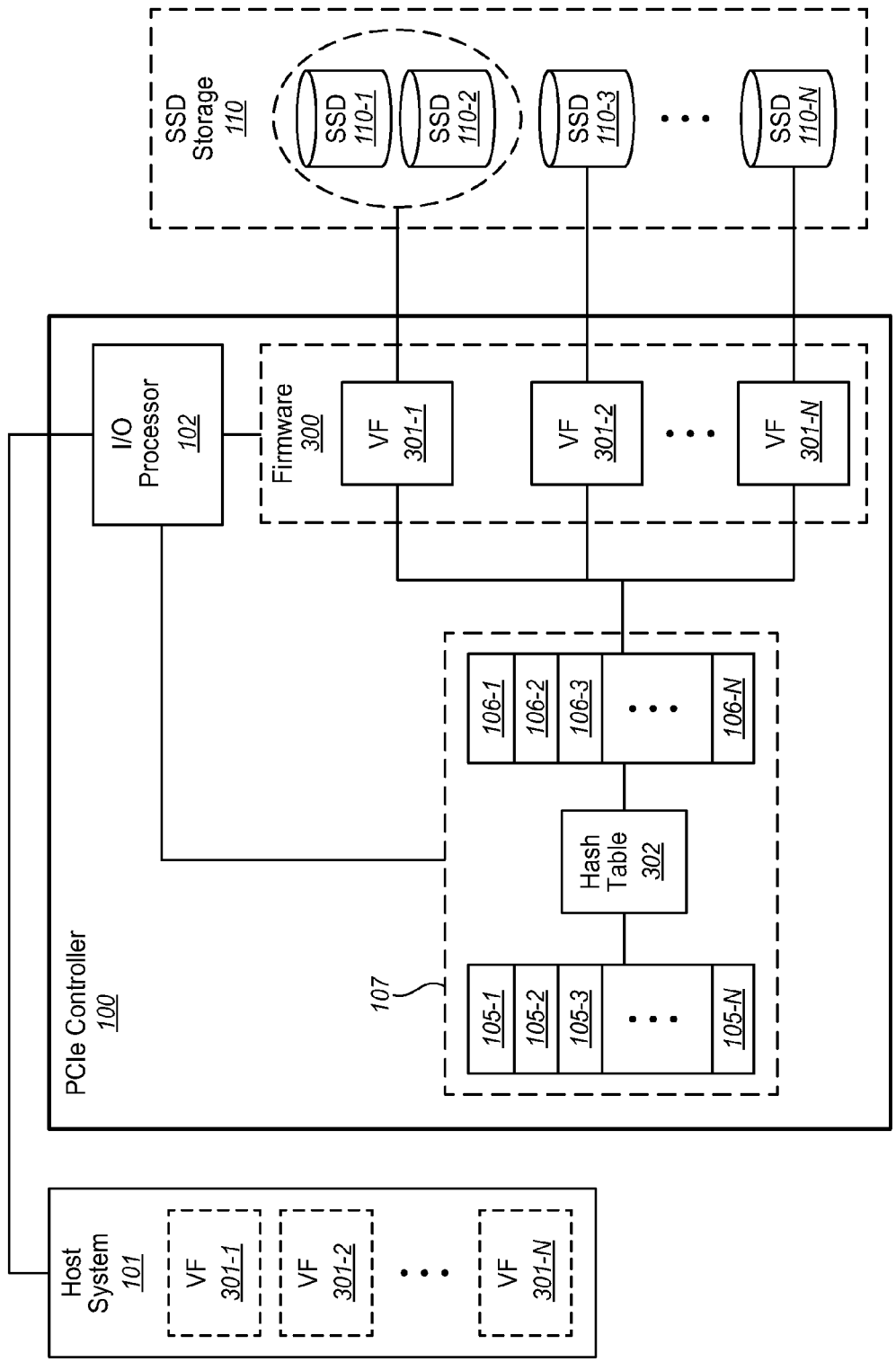
FIG. 4 is a block diagram illustrating exemplary virtual function couplings to SSDs.

As mentioned, the PCIe controller 100 generally includes firmware that performs the partitioning of the DRAM 107. This firmware may also be operable to implement the virtual function logic 103 and any of the VFs associated therewith. FIG. 4 illustrates one embodiment of the PCIe controller 100 configured with firmware 300 that is operable to generate a plurality of VFs 301-1-301-N such that the host system 101 can process I/O requests to the SSDs 110.

In this embodiment, the generated VFs 301 are each operable to communicatively couple to one or more of the SSD 110. The VFs 301 are presented to the host system 101 through the I/O processor 102 and are operable to direct I/O processing to the individual logical blocks of the SSDs 110. For example, each logical block 106 in the DRAM 107 may be mapped to a corresponding logical block in the SSDs 110. Each VF 301 may be operable to process I/O requests from the host system 101 to one or more of the SSDs 110 and thus multiple logical blocks of the SSDs 110. The I/O requests are actually directed to the logical blocks 106 of the DRAM 107 via the VFs 301. But, the logical blocks 106 of the DRAM 107 are transparent to the host system 101 as the VFs 301 appear to represent a direct interface to the logical blocks of the SSDs 110.

In this example, the VF 3011 handles I/O requests to the SSDs 110-1 and 110-2, the VF 301-2 handles I/O requests to the SSD 110-3, and the VF 301-N handles I/O requests to the SSD 110-N. Now, assume that the logical block 106-1 is mapped to a corresponding logical block in the SSD 110-1. When the host system 101 needs to write data to the logical block 106-1, the host system 101 transfers the I/O request to the VF 301-1 presented to the host system 101 through the I/O processor 102. The VF 301-1 transfers the data to one of the buffers 105 where a hash table 302 maps the data to the logical block 106-1 in the DRAM 107. Once cached in the logical block 106-1, the VF 301-1 writes the data of the I/O request to the corresponding logical block in the SSD 110-1 through the NVMe interface 104.

Read requests to the logical blocks of the SSDs 110 are performed in a similar fashion. However, since the logical blocks 106 of the DRAM 107 are correspondingly mapped to the logical blocks of the SSDs 110 (e.g., while power is applied to the PCIe controller 100 and thus the DRAM 107), data remains cached in the logical blocks 106 for relatively quick access by the host system 101. For example, assume that the logical block 106-N is mapped to a logical block in the SSD 110-N and that the VF 301-N is operable to process I/O requests to the SSD 110N. Instead of having to contact the SSD 110-N directly through a physical interface, the host system 101 can simply access the data through the VF 301-N presented by the I/O processor 102. In this regard, the VF 301N simply retrieves the data from the logical block 106 to one of the buffers 105 for immediate access by the host system 101.

The buffers 105 of the PCIe controller 100 are operable to transfer data rather quickly and are generally non-protocol specific. For example, the buffers 105-1-105-N may be simple FIFO buffers that retain for a very short period of time before it is transferred out. As there are likely fewer buffers 105 than there are logical blocks 106 on the PCIe controller 100, the hash table 302 provides a relatively efficient mechanism for reusing buffers 105 that retrieve data from the logical blocks 106 of the DRAM 107. And, as it is generally just the data of a particular I/O request from the host system 101 that is being stored in the buffers 105, the VF 301 and for that matter the host system 101, is not burdened by the overhead associated with any particular protocol. That is, the host system 101 can simply retrieve the data stored in the buffers 105 via the VFs 301 without using any specific protocol commands.

Figure 5:
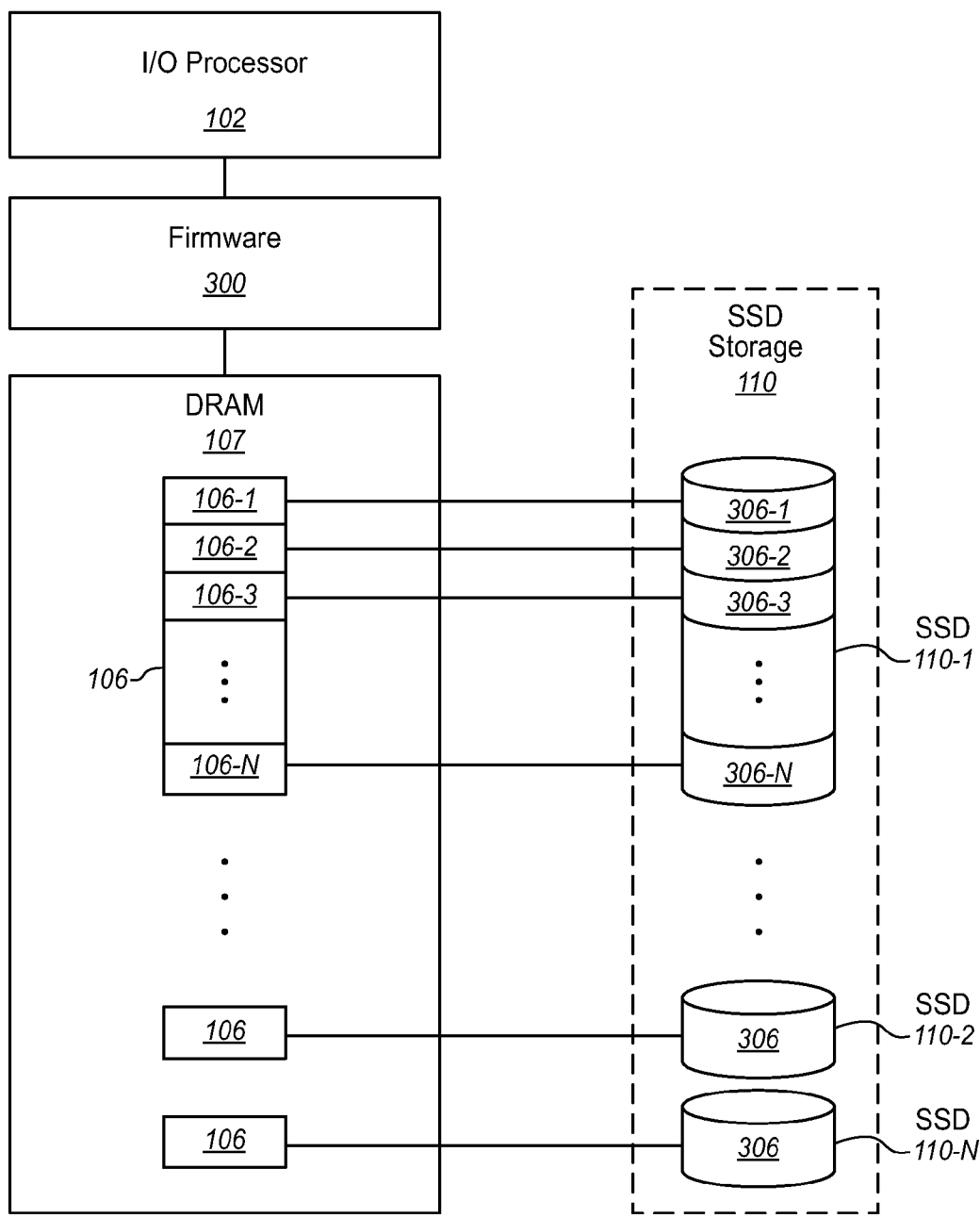
FIG. 5 is a block diagram illustrating exemplary mappings between logical blocks of a DRAM and logical blocks of SSDs.

FIG. 5 illustrates logical block mappings between the DRAM 107 and the SSD devices 110. In this embodiment, the firmware 300 is configured to partition the DRAM 107 to the logical blocks 106. The firmware 300 is also operable to partition the SSDs 110 into a plurality of logical blocks 306. Examples of such logical block partitioning in SSDs 110 can be found in a Redundant Array of Independent Disks (RAID) storage systems that spread logical blocks across a number of logical volumes with each logical volume being configured from one or more storage devices (e.g., disk drives, SSDs, etc.).

To illustrate, the firmware 300 is operable to partition a first set of logical blocks 106-1-106-N in the DRAM 107 when the PCIe controller 100 initializes. The firmware 300 also partitions the SSD 110-1 into the logical blocks 306-1-306-N. The firmware 300 maps the logical blocks 106-1-106-N in the DRAM 107 directly to the logical blocks 306-1-306-N. The firmware 300 is generally stored in a nonvolatile memory space of the PCIe controller 100 such that this mapping is maintained even in the event of a power outage to the PCIe controller 100. The firmware 300 may also retain the mappings of the VFs 301 to the logical blocks in the DRAM 106. Thus, the PCIe controller 100 is operable to quickly present the logical blocks 306 of the SSDs 110 to any attached host system upon initialization.

Figure 6:
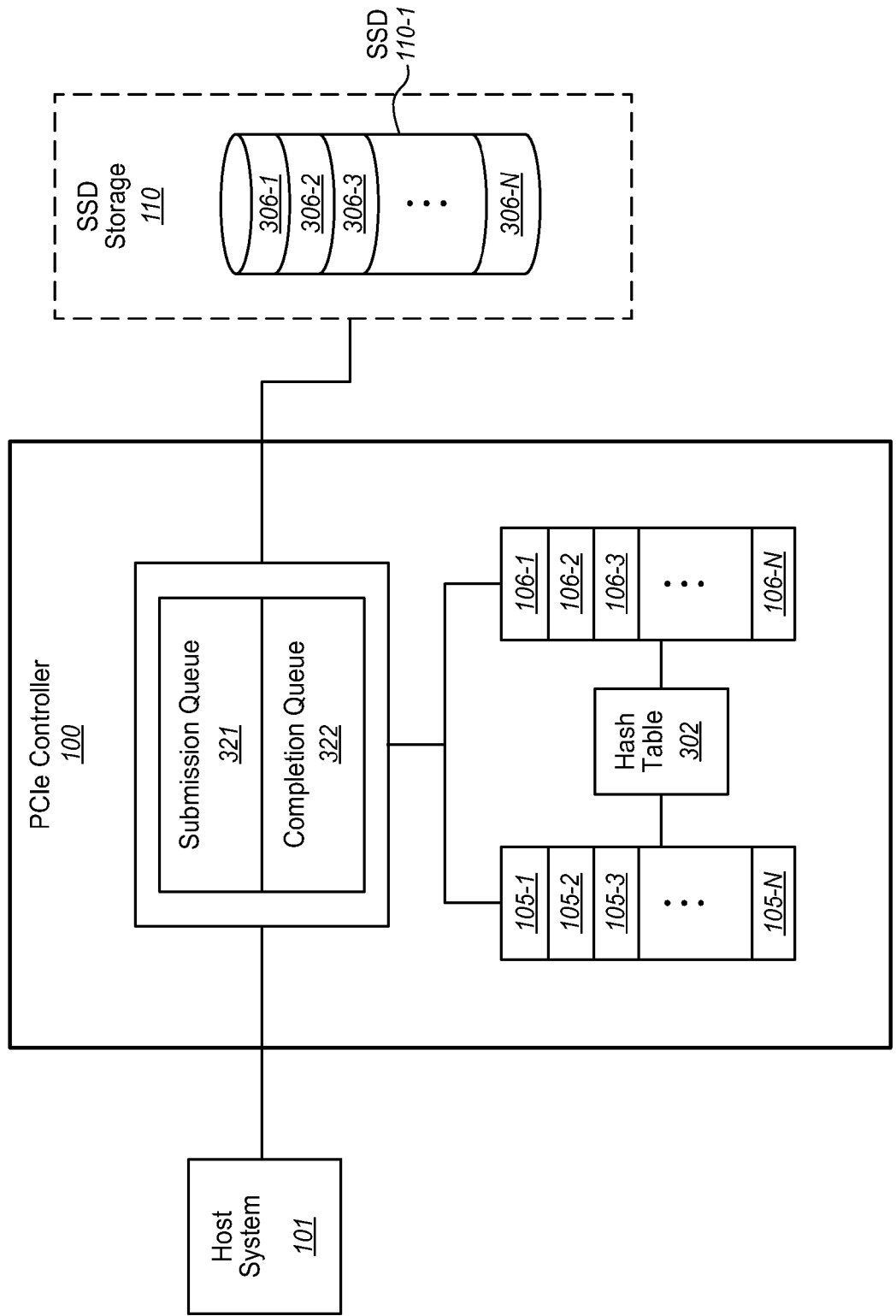
FIG. 6 is another block diagram of the exemplary PCIe controller coupled to SSDs.

FIG. 6 is another block diagram of the exemplary PCIe controller 100 coupled to SSDs 110. In this embodiment, the PCIe controller 100 is also configured with a submission queue 321 and a completion queue 322, generally configured with the DRAM 107 to assist with I/O processing to the logical blocks 306 of the SSDs 110. For example, data for a write I/O request may be transferred to a buffer 105 for storage in a logical block 306-1 of the SSD 110-1. The hash table 302 looks up the LBA of the logical block 306-1 and its corresponding logical block 106-1 in the DRAM 107. The hash table 302 translates the logical block 106-1 into a memory address of the DRAM 107. The buffer 105 and transfer the data to the logical block 106-1 based on that translated memory address. From there, the data is placed in the submission queue 321 for transfer to the logical block 306-1 based on the mapping by the resident firmware. Acknowledgment of the process I/O is then placed in the completion queue 322 for ultimate delivery to the host system 101.

Read I/O processing may be performed in a similar fashion. In any case, it should be noted that the buffers 105 may operate as a cache memory for the I/O processing. In this regard, the LBAs of the logical blocks 106 may be accessed directly by the buffers 105 (and vice versa) via direct memory accesses (DMAs) based on the translation of LBAs by the hash table 302. This process provides some instant redundancy in case of a failure by the SSD 110. For example, if the SSD 110 fails, the data of the write I/O request is retained with the logical block 106.

Figure 7:
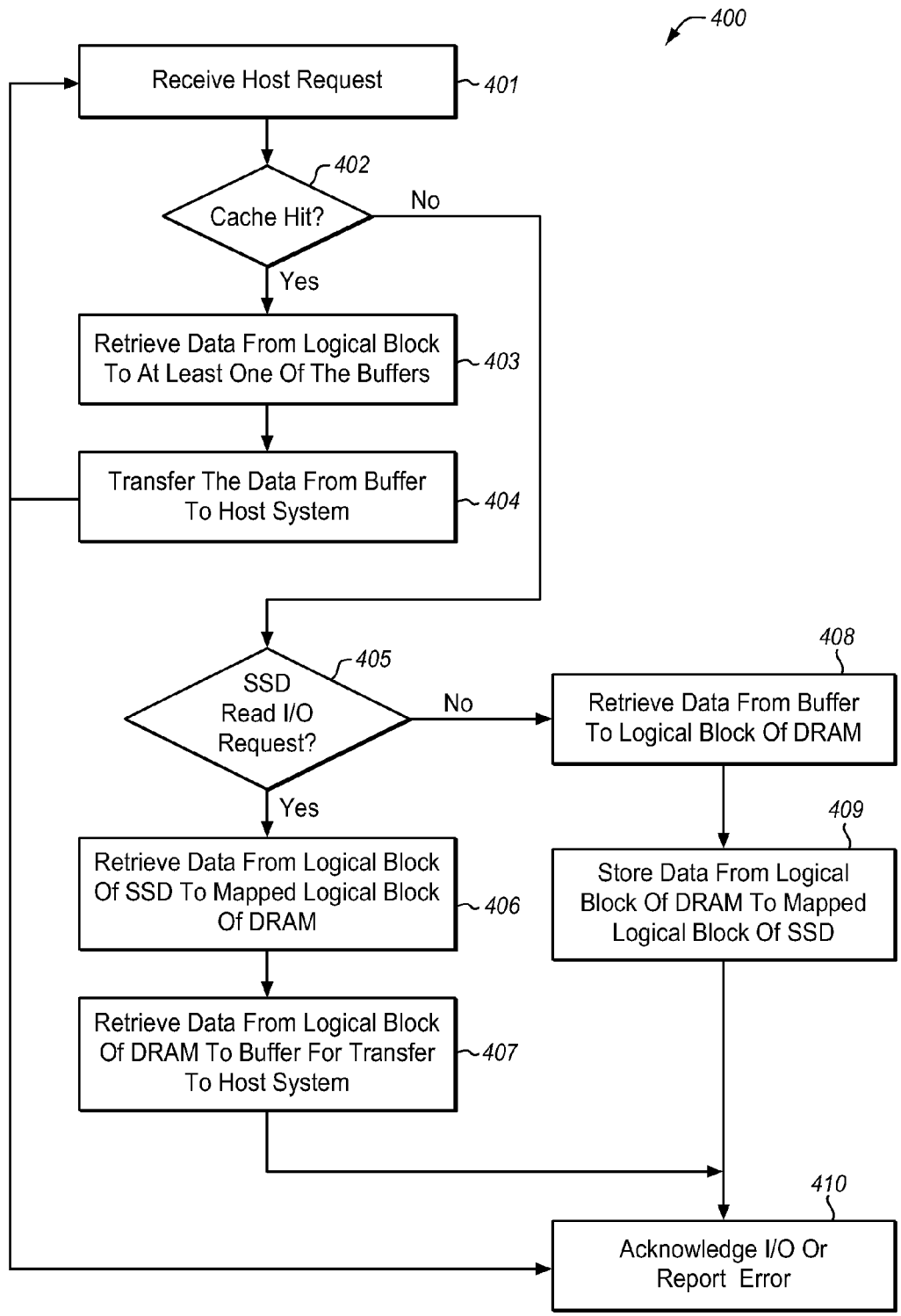
FIG. 7 is a flowchart of another exemplary process of the PCIe controller of FIG.

With these exemplary embodiments in mind, another exemplary process of the PCIe controller 100 is presented in FIG. 7. In this embodiment, the PCIe controller 100 is presumed to be operational and routinely processing I/O requests. The process 400 thus initiates when the host system 101 request data from the PCIe controller 100, in the process element 401. Upon receiving this request, the PCIe controller 100 determines whether the request is for data has been cached in the buffers 105 (e.g., a "buffer cache hit"), in the process element 402, or whether the request is an actual read/write I/O request. If the request is a cache hit, the VF 301 handling the request on behalf of the I/O processor 102 retrieves the data from a logical block 106, in the process element 403, to at least one of the buffers 105. The VF 301 then transfers the data from the buffers 105 to the host system 101, in the process element 404.

Alternatively, the request from the host system 101 may be for other data from the buffers 105. For example, the host system 101 may routinely store log data associated with read/write I/O requests to the SSD 110. The host system 101 may temporarily store this data in the buffers 105. When this data is required by the host system 101, the host system 101 may send a simple non-protocol specific message to the VF 301 for the VF 301 to quickly transfer that data to the host system 101, thereby avoiding any burdensome overhead associated with storage protocol stacks. Once processed, the PCIe controller 100 continues to monitor for other host requests, in the process element 401.

If the data request from the host system 101 is not a cache hit (in other words, the data request is an I/O request to one of the logical blocks 306 of the SSDs 110), the PCIe controller 100 determines whether the I/O request is a read I/O request or a write I/O request to one or more of the SSDs 110, in the process element 405. If the I/O request is a read I/O request, the PCIe controller 100 and more specifically the VF 301 handling the request, may retrieve the data from the logical block of the SSD 110 to its corresponding mapped logical block in the DRAM 107, in the process element 406 (e.g., based on an LBA of the I/O request), in what may be referred to as a "cache miss". From there, the VF 301 retrieves the data from the logical block of the DRAM 107 to one or more the buffers 105 (e.g., as mapped by the hash table 302) for transfer to the host system 101, in the process element 407. Alternatively, the VF 301 handling the request may simply check the logical block 106 in the DRAM 107 to determine if the data of the read I/O request is present there and retrieve that data to one or more of the buffers 105 for transfer to the host system 101, an LBA cache hit.

If the I/O request is a write I/O request, the VF 301 handling the request may retrieve the data from one or more of the buffers 105 to the logical block 106 of the DRAM 107 linked to the logical block 306 of the SSD 110 in the request, in the process element 408. For example, the VF 301 may extract the data of the I/O request and temporarily store it in one or more of the buffers 105 for subsequent transfer to a logical block 106 of the DRAM 107 via the hash table 302. In doing so, the VF 301 may extract an LBA of the SSD 110 from the I/O request to direct the data to the logical block of the DRAM 107 with the corresponding LBA for subsequent delivery to the LBA of the SSD 100. Alternatively, the VF 301 may simply extract the data of the I/O request and store it in the logical block 106 of the DRAM 107 as persistent storage.

Once the read I/O request or the write I/O request is processed, the PCIe controller 100 either acknowledges to the host system 101 that the I/O request has been processed or reports any errors associated with the I/O request to the host system 101, in the process element 410, and then continues monitoring for additional requests in the process element 401.

Figure 8:
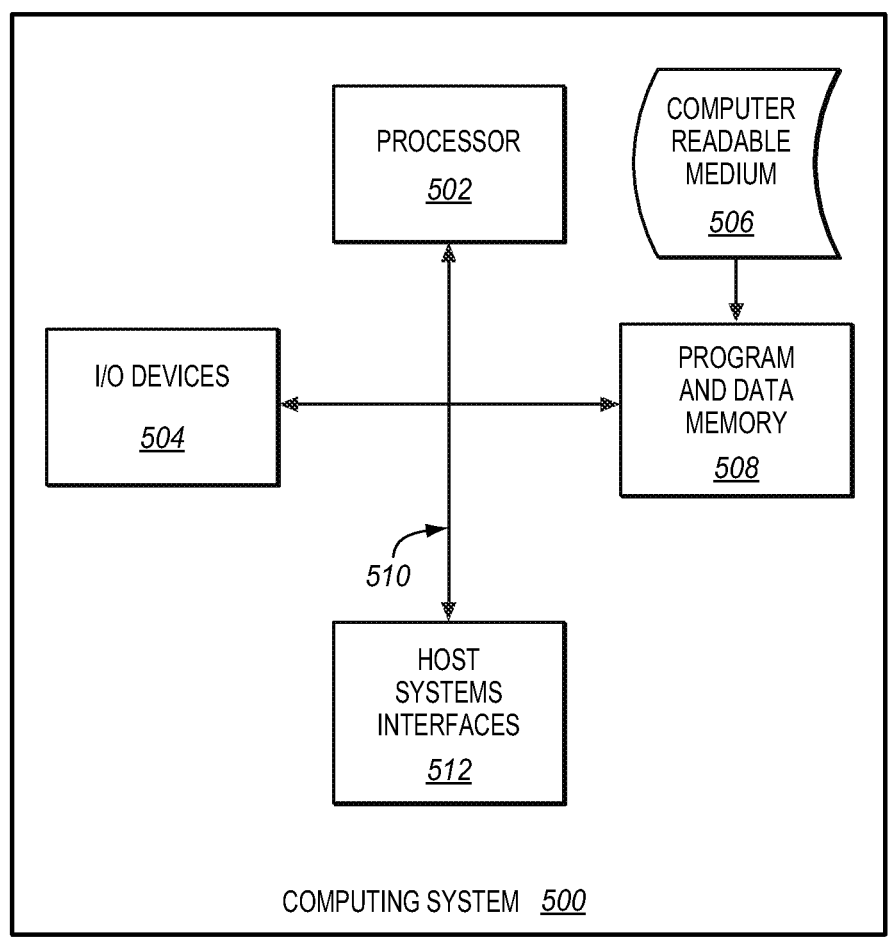
FIG. 8 illustrates an exemplary computer system operable to execute programmed instructions to perform desired functions.

Additionally, the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 8 illustrates a computing system 500 in which a computer readable medium 506 may provide instructions for performing any of the methods disclosed herein.

Furthermore, the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A Peripheral Component Interconnect Express (PCIe) controller configured with a Non-Volatile Memory express (NVMe) interface, the controller comprising:
   a plurality of buffers;
   a Dynamic Random Access Memory (DRAM) device;
   an Input/Output (I/O) processor operable to partition the DRAM device into a plurality of logical blocks, each of the plurality of logical blocks being mapped to a corresponding logical block of one or more external storage devices coupled to the PCIe controller; and
   virtual function logic communicatively coupled to the logical blocks of the DRAM device and to the plurality of buffers,
   wherein the virtual function logic is communicatively coupled to a host system through the I/O processor to process an I/O request from the host system to a logical block of the DRAM device while bypassing the NVMe interface, to retrieve data from the logical block to at least one of the buffers while bypassing the NVMe interface, and to transfer the data from the at least one of the buffers to the host system while bypassing the NVMe interface.

2. The PCIe controller of claim 1, wherein:
   the one or more external storage devices are a plurality of solid state drives (SSDs),
   the NVMe interface is operable to communicatively couple to the plurality of solid state drives (SSDs); and
   the virtual function logic is operable to communicatively couple to the SSDs through the NVMe interface.

3. The PCIe controller of claim 2, wherein:
   the SSDs are partitioned into logical blocks that are communicatively coupled to the logical blocks of the DRAM.

4. The PCIe controller of claim 3, further comprising:
   a firmware module that maintains mappings of the logical blocks of the DRAM to the logical blocks of the SSDs.

5. The PCIe controller of claim 3, wherein:
   the virtual function logic is further operable to process a write I/O request to one of the logical blocks of the SSDs, to write data of the write I/O request to a first of the logical blocks of the DRAM, and to transfer the data from the first logical block of the DRAM to a first of the logical blocks of the SSDs.

6. The PCIe controller of claim 3, wherein:
the virtual function logic is further operable to process a read I/O request for one of the logical blocks of the SSDs, to retrieve data of the I/O request from a first of the logical blocks of the SSDs, to place the data in a first of the logical blocks of the DRAM, and to transfer the data to one of the buffers for transfer to the host system.

7. The PCIe controller of claim 1, further comprising:
a hash table communicatively coupled to the buffers and to the logical blocks of the DRAM to map data between the buffers and the logical blocks of the DRAM.

8. A method operable in a Peripheral Component Interconnect Express (PCIe) controller configured with a Non-Volatile Memory express (NVMe) interface, the method comprising:
partitioning a Dynamic Random Access Memory (DRAM) device of the PCIe controller into a plurality of logical blocks, each of the plurality of logical blocks being mapped to a corresponding logical block of one or more external storage devices coupled to the PCIe controller;
coupling virtual function logic to the logical blocks of the DRAM device and to a plurality of buffers of the PCIe controller;
coupling the virtual function logic to a host system; and
via the virtual function logic:
processing an I/O request from the host system to a logical block of the DRAM device while bypassing the NVMe interface;
retrieving data from the logical block to at least one of the buffers while bypassing the NVMe interface; and
transferring the data from the at least one of the buffers to the host system while bypassing the NVMe interface.

9. The method of claim 8, wherein:
the one or more external storage devices are a plurality of solid state drives (SSDs),
the NVMe interface is communicatively coupled to the plurality of solid state drives (SSDs); and
the method further comprises communicatively coupling the virtual function logic to the SSDs through the NVMe interface.

10. The method of claim 9, further comprising:
partitioning the SSDs into logical blocks; and
communicatively coupling the logical blocks of the SSDs to the logical blocks of the DRAM.

11. The method of claim 10, further comprising, via the virtual function logic:
processing a write I/O request to one of the logical blocks of the SSDs;
placing data of the write I/O request in a first of the logical blocks of the DRAM; and
transferring the data from the first logical block of the DRAM to a first of the logical blocks of the SSDs.

12. The method of claim 10, further comprising, via the virtual function logic:
processing a read I/O request for one of the logical blocks of the SSDs;
retrieving data of the I/O request from a first of the logical blocks of the SSDs; and
placing the data in a first of the logical blocks of the DRAM; and
transferring the data to one of the buffers for transfer to the host system.

13. The method of claim 8, further comprising:
communicatively coupling a hash table to the buffers and to the logical blocks of the DRAM to map data between the buffers and the logical blocks of the DRAM.

14. A non-transitory computer readable medium comprising instructions that, when executed by a processor on a Peripheral Component Interconnect Express (PCIe) controller configured with a Non-Volatile Memory express (NVMe) interface, direct the processor to:
partition a Dynamic Random Access Memory (DRAM) device of the PCIe controller into a plurality of logical blocks, each of the plurality of logical blocks being mapped to a corresponding logical block of one or more external storage devices coupled to the PCIe controller;
couple virtual function logic to the logical blocks of the DRAM device and to a plurality of buffers of the PCIe controller;
couple the virtual function logic to a host system; and
via the virtual function logic:
process an I/O request from the host system,
wherein if the I/O request is a write request, the virtual function logic processes the write request by i) writing data to at least one buffer of the plurality of buffers without accessing the one or more external storage devices through the NVMe interface, ii) transferring the data in the at least one buffer to the logical block of the DRAM device without accessing the one or more external storage devices through the NVMe interface, and iii) writing the data in the logical block of the DRAM device to a corresponding logical block of the one or more external storage devices through the NVMe interface, and
wherein the if the I/O request is a read request, the virtual function logic processes the read request by i) retrieving the data from the logical block of the DRAM device to the at least one buffer without accessing the one or more external storage devices through the NVMe interface, and ii) sending the data from the at least one buffer to the host system without accessing the one or more external storage devices through the NVMe interface.

15. The computer readable medium of claim 14, wherein:
the one or more external storage devices are a plurality of solid state drives (SSDs);
the NVMe interface is communicatively coupled to the plurality of solid state drives (SSDs); and
the computer readable medium further comprises instructions that direct the processor to communicatively couple the virtual function logic to the SSDs through the NVMe interface.

16. The computer readable medium of claim 15, further comprising instructions that direct the processor to:
partition the SSDs into logical blocks; and
communicatively couple the logical blocks of the SSDs to the logical blocks of the DRAM.

17. The computer readable medium of claim 16, further comprising instructions that direct the processor to, via the virtual function logic:
process the write I/O request to one of the logical blocks of the SSDs;
place data of the write I/O request in a first of the logical blocks of the DRAM; and
transfer the data from the first logical block of the DRAM to a first of the logical blocks of the SSDs.

18. The computer readable medium of claim 16, further comprising instructions that direct the processor to, via the virtual function logic:

process the read I/O request for one of the logical blocks of the SSDs;

retrieve data of the read I/O request from a first of the logical blocks of the SSDs;

place the data in a first of the logical blocks of the DRAM; and transfer the data to one of the buffers for transfer to the host system.

19. The computer readable medium of claim 14, further comprising further comprising instructions that direct the processor to:

communicatively couple a hash table to the buffers and to the logical blocks of the DRAM to map data between the buffers and the logical blocks of the DRAM.

20. A Peripheral Component Interconnect Express (PCIe) controller configured with a Non-Volatile Memory express (NVMe) interface and operable to read and write data to a solid state drive (SSD), the controller comprising:

a Dynamic Random Access Memory (DRAM) device;

an Input/Output (I/O) processor operable to partition the DRAM device into a plurality of logical blocks and to assign logical block addresses (LBAs) to the logical blocks that correspond to LBAs of the SSD, the SSD being external to the PCIe controller; and virtual function logic communicatively coupled to the logical blocks of the DRAM device, wherein the virtual function logic is communicatively coupled to a host system through the I/O processor to process an I/O request from the host system to a logical block of the SSD while bypassing the NVMe interface, to extract an LBA of the logical block of the SSD from the I/O request while bypassing the NVMe interface, and to address the corresponding LBA of the DRAM based on the extracted LBA to fulfill the I/O request while bypassing the NVMe interface.

21. The PCIe controller of claim 20, wherein the virtual function logic is further operable to:

determine whether the I/O request is a read I/O request or a write I/O request; and in response to a read I/O request, check the logical block of the DRAM based on the extracted LBA, and retrieve data of the I/O request from the checked logical block of the DRAM to the host system.

22. The PCIe controller of claim 20, wherein the virtual function logic is further operable to determine whether the I/O request is a read I/O request or a write I/O request; and in response to a write I/O request, write data of the I/O request to the logical block of the DRAM based on the extracted LBA, and write the data of the I/O request to the logical block of the SSD through the NVMe interface.

23. The PCIe controller of claim 20, further comprising:

a plurality of buffers, wherein the virtual function logic is further operable to cache data of the host system in the buffers.

24. A method operable in a Peripheral Component Interconnect Express (PCIe) controller configured with a Non-Volatile Memory express (NVMe) interface, wherein the controller is operable to read and write data to a solid state drive (SSD), the method comprising:

partitioning a Dynamic Random Access Memory (DRAM) device of the PCIe controller into a plurality of logical blocks;

assigning logical block addresses (LBAs) to the logical blocks that correspond to LBAs of the SSD, the SSD being external to the PCIe controller;

mapping the logical blocks of the DRAM device to logical blocks of the SSD based on the assigned LBAs; and virtually coupling a host system to process an I/O request from the host system to a logical block of the SSD, wherein virtually coupling the host system comprises:

extracting an LBA of the logical block of the SSD from the I/O request while bypassing the NVMe interface; and addressing the corresponding LBA of the DRAM based on the extracted LBA to fulfill the I/O request while bypassing the NVMe interface.

25. The method of claim 24, further comprising:

caching data of the host system in a plurality of buffers of the controller through a virtual function of the controller.

* * * * *